United States Patent
Stephens et al.

(10) Patent No.: US 12,197,916 B2
(45) Date of Patent: Jan. 14, 2025

(54) PROCESSING INSTRUCTIONS SELECTED FROM A FIRST INSTRUCTION SET IN A FIRST PROCESSING MODE AND INSTRUCTIONS SELECTED FROM A SECOND DIFFERENT INSTRUCTION SET IN A SECOND PROCESSING MODE

(71) Applicant: ARM LIMITED, Cambridge (GB)

(72) Inventors: Nigel John Stephens, Cambridge (GB); David Hennah Mansell, Cambridge (GB); Richard Roy Grisenthwaite, Cambridge (GB); Matthew Lucien Evans, Cambridge (GB); Jelena Milanovic, Sophia Antipolis (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/006,813

(22) PCT Filed: Jul. 8, 2021

(86) PCT No.: PCT/GB2021/051743
§ 371 (c)(1),
(2) Date: Jan. 25, 2023

(87) PCT Pub. No.: WO2022/023704
PCT Pub. Date: Feb. 3, 2022

(65) Prior Publication Data
US 2023/0273792 A1    Aug. 31, 2023

(30) Foreign Application Priority Data
Jul. 30, 2020 (GB) .................................... 2011873

(51) Int. Cl.
*G06F 9/30* (2018.01)
*G06F 9/38* (2018.01)

(52) U.S. Cl.
CPC ........ *G06F 9/3016* (2013.01); *G06F 9/30036* (2013.01); *G06F 9/3887* (2013.01); *G06F 9/38873* (2023.08)

(58) Field of Classification Search
CPC ...................................................... G06F 9/3016
See application file for complete search history.

(56) References Cited

U.S. PATENT DOCUMENTS

| | | | |
|---|---|---|---|
| 2008/0114970 A1 | 5/2008 | Colavin | |
| 2012/0216012 A1* | 8/2012 | Vorbach | G06F 9/3001 712/E9.003 |

(Continued)

FOREIGN PATENT DOCUMENTS

| | | |
|---|---|---|
| CN | 104899181 | 9/2015 |
| CN | 107408103 | 11/2017 |

(Continued)

OTHER PUBLICATIONS

Robert Bedichek, "Some Efficient Architecture Simulation Techniques", Department of Computer Science, FR-35 University of Washington, Seattle, Washington 98195, robertb@cs.washington.edu, 1990.

(Continued)

*Primary Examiner* — Michael J Metzger
(74) *Attorney, Agent, or Firm* — NIXON & VANDERHYE P.C.

(57) ABSTRACT

Instruction decoder to decode processing instructions; one or more first registers; first processing circuitry to execute the decoded processing instructions in a first processing mode and configured to execute the decoded processing instructions using the one or more first registers; and control circuitry to execute the decoded processing instructions in a second processing mode using one or more second registers; the instruction decoder being configured to decode processing instructions selected from a first instruction set and a (Continued)

second instruction set in the second processing mode, in which one or both of the first and second instruction sets comprises at least one unique instruction set; the instruction decoder configured to decode one or more mode change instructions to change between the first and second processing mode; and the first processing circuitry configured to change the current processing mode between the first and second processing mode responding to executing mode change instruction.

18 Claims, 9 Drawing Sheets

(56) References Cited

U.S. PATENT DOCUMENTS

2014/0281370 A1* 9/2014 Khan .................... G06F 9/3887
 712/7
2014/0281435 A1* 9/2014 Perkins ................. G06F 8/4452
 712/227
2018/0203699 A1* 7/2018 Stephens ............. G06F 9/30189
2019/0340054 A1* 11/2019 Boettcher ........... G06F 11/1637
2021/0203504 A1* 7/2021 Brandt ................ G06F 9/30025

FOREIGN PATENT DOCUMENTS

| CN | 107851015 | 3/2018 |
| CN | 110192186 | 8/2019 |
| GB | 2545248 A | 6/2017 |
| WO | 96/24895 A1 | 8/1996 |

OTHER PUBLICATIONS

Office Action for TW Application No. 110127893 issued Sep. 30, 2024 and English translation, 21 pages.

* cited by examiner

PROCESSING INSTRUCTIONS SELECTED FROM A FIRST INSTRUCTION SET IN A FIRST PROCESSING MODE AND INSTRUCTIONS SELECTED FROM A SECOND DIFFERENT INSTRUCTION SET IN A SECOND PROCESSING MODE

BACKGROUND

This disclosure relates to vector processing.

Some data processing arrangements allow for vector processing operations, involving applying a single vector processing instruction to data items of a data vector having a plurality of data items at respective positions in the data vector. By contrast, scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

It has been proposed to provide a vector processing instruction set which is "agnostic" with respect to the physical vector length provided by hardware by which code containing instructions from that instruction set is executed. An example is an instruction set defined by the so-called "Scalable Vector Extension" (SVE) or the SVE2 architectures originating from Arm Ltd. However, the decoding and/or executing of at least some instructions of such an instruction set requires knowledge of an available vector length compatible with that provided by the actual hardware.

SUMMARY

In an example arrangement there is provided apparatus comprising:
an instruction decoder to decode processing instructions;
one or more first registers;
first processing circuitry to execute the decoded processing instructions in a first processing mode in which the first processing circuitry is configured to execute the decoded processing instructions using the one or more first registers; and
control circuitry to selectively initiate execution of the decoded processing instructions in a second processing mode in which the decoded processing instructions are selectively executed using one or more second registers;
the instruction decoder being configured to decode processing instructions selected from a first instruction set in the first processing mode and processing instructions selected from a second instruction set in the second processing mode, in which one or both of the first and second instruction sets comprises at least one instruction which is unavailable in the other of the first and second instruction sets;
the instruction decoder being configured to decode one or more mode change instructions to change between the first processing mode and the second processing mode; and
the first processing circuitry being configured to change the current processing mode between the first processing mode and the second processing mode in response to execution of a mode change instruction.

In another example arrangement there is provided a method comprising:
decoding processing instructions;
executing the decoded processing instructions in a first processing mode in which the processing circuitry is configured to execute the decoded processing instructions using one or more first registers; and
selectively initiating execution of the decoded processing instructions in a second processing mode in which the decoded processing instructions are selectively executed using one or more second registers;
the decoding step comprising decoding processing instructions selected from a first instruction set in the first processing mode and processing instructions selected from a second instruction set in the second processing mode, in which one or both of the first and second instruction sets comprises at least one instruction which is unavailable in the other of the first and second instruction sets;
the decoding step comprising decoding one or more mode change instructions to change between the first processing mode and the second processing mode; and
the executing step comprising changing the current processing mode between the first processing mode and the second processing mode in response to execution of a mode change instruction.

In another example arrangement there is provided a computer program for controlling a host data processing apparatus to provide an instruction execution environment comprising:
an instruction decoder to decode processing instructions;
one or more first registers;
first processing circuitry to execute the decoded processing instructions in a first processing mode in which the first processing circuitry is configured to execute the decoded processing instructions using the one or more first registers; and
control circuitry to selectively initiate execution of the decoded processing instructions in a second processing mode in which the decoded processing instructions are selectively executed using one or more second registers;
the instruction decoder being configured to decode processing instructions selected from a first instruction set in the first processing mode and processing instructions selected from a second instruction set in the second processing mode, in which one or both of the first and second instruction sets comprises at least one instruction which is unavailable in the other of the first and second instruction sets;
the instruction decoder being configured to decode one or more mode change instructions to change between the first processing mode and the second processing mode; and
the first processing circuitry being configured to change the current processing mode between the first processing mode and the second processing mode in response to execution of a mode change instruction.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
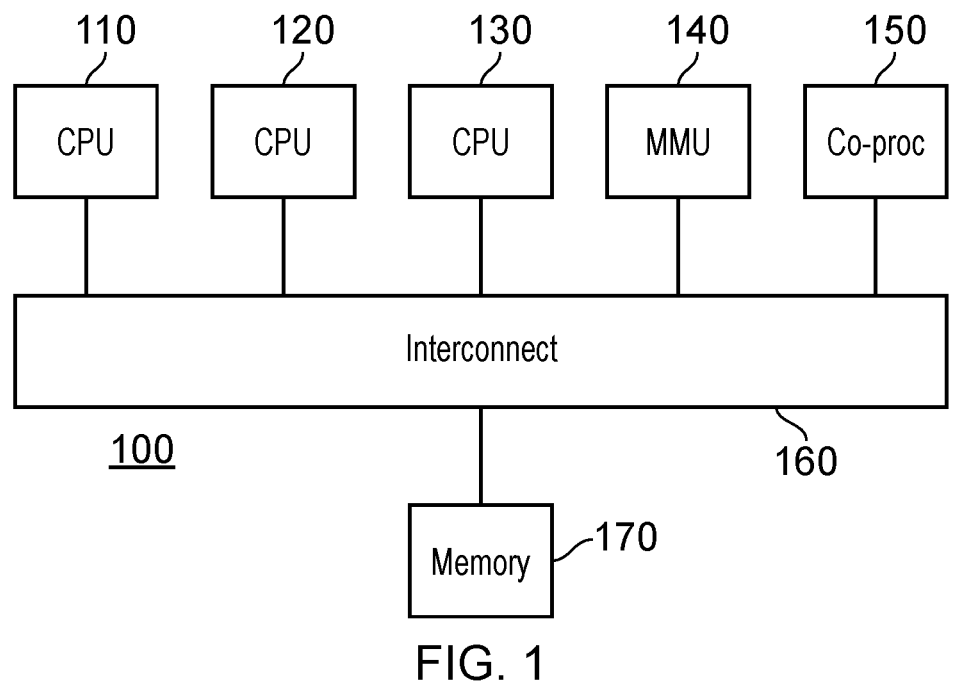
FIG. 1 schematically illustrates a data processing apparatus.

Before discussing the embodiments with reference to the accompanying Figures, the following description of embodiments is provided.

An example embodiment provides apparatus comprising:
an instruction decoder to decode processing instructions;
one or more first registers;
first processing circuitry to execute the decoded processing instructions in a first processing mode in which the first processing circuitry is configured to execute the decoded processing instructions using the one or more first registers; and
control circuitry to selectively initiate execution of the decoded processing instructions in a second processing mode in which the decoded processing instructions are selectively executed using one or more second registers;
the instruction decoder being configured to decode processing instructions selected from a first instruction set in the first processing mode and processing instructions selected from a second instruction set in the second processing mode, in which one or both of the first and second instruction sets comprises at least one instruction which is unavailable in the other of the first and second instruction sets;
the instruction decoder being configured to decode one or more mode change instructions to change between the first processing mode and the second processing mode; and
the first processing circuitry being configured to change the current processing mode between the first processing mode and the second processing mode in response to execution of a mode change instruction.

Embodiments of the disclosure can provide a mode change, instigated by execution of a processing instruction, between first and second modes having respective instruction sets which at least do not completely overlap, and using respective first and second sets of registers (note that the first and second registers may be different registers, potentially having different sizes and/or capabilities—for example with some acting as matrix registers and/or with at least some of the first and second registers potentially being vector registers of potentially different physical vector lengths).

The instruction decoder is configured to decode processing instructions selected from a first instruction set in the first processing mode and processing instructions selected from a second instruction set in the second processing mode; and one or both of the first and second instruction sets comprises at least one instruction which is unavailable in the other of the first and second instruction sets. This advantageously allows the potential (a) to provide additional functionality at one of the processing circuitries, for example at the second processing circuitry (for example a co-processor) which is not available at the other of the processing circuitries, and (b) to avoid having to provide some basic functionality at both of the processing circuitries, where that functionality can be adequately provided just by one of the processing circuitries (for example, providing some scalar processing functionality only at the first processing circuitry). As a further example, the second processing circuitry may comprise matrix processing circuitry; and the second instruction set comprises one or more matrix processing instructions which are unavailable in the first instruction set.

In some embodiments, the processing instructions include vector processing instructions; the one or more first registers comprise one or more first vector registers having a first vector length; the first processing circuitry is configured, in the first processing mode, to execute the decoded processing instructions using the one or more first vector registers in accordance with a vector length no greater than the first vector length; and in the second processing mode in which the decoded processing instructions are selectively executed using one or more second vector registers having a second vector length, in accordance with a vector length no greater than the second vector length.

Such embodiments of the present disclosure can provide a further mode of operation within the context of vector processing such that a change between first and second processing modes can be initiated by execution of a mode change instruction, with such a change having the effect of potentially changing the routing of decoded processing instructions (for example, to second processing circuitry such as a co-processor in the second processing mode) and also potentially changing the vector length applicable to the execution of instructions in the second processing mode.

This arrangement advantageously allows, for example, a co-processor to be used which may have a different hardware vector length to that of a main CPU (which executes all instructions in the first processing mode, for example), while allowing the code which may be for example vector length agnostic code to take advantage of the vector length available at the main CPU in the first processing mode and at the co-processor in the second processing mode.

In some examples, the first processing circuitry is operable to execute processing instructions at a prevailing exception level of a hierarchy of exception levels each having a respective level of privilege to access processing resources of the apparatus. For example, the first processing circuitry may be configured to detect a vector length for execution of instructions in the first processing mode and a vector length for execution of instructions in the second processing mode by executing a vector length detection processing instruction.

In operation, the first processing circuitry may be configured to execute a vector length setting processing instruction at an exception level other than a lowest exception level, to set a maximum vector length applicable to that exception level and at least one lower exception level. In other words, code executed at a lowest exception level is not able to set its own maximum vector length in normal operation. For example, the first processing circuitry may be configured to execute the vector length setting processing instruction to set a vector length for use in the first processing mode to be no higher than the first vector length and to set a vector length for use in the second processing mode to be no higher than the second vector length. In some examples, the first processing circuitry is configured to execute the vector length setting processing instruction at a given exception level to set a vector length for use in a given processing mode no higher than the maximum vector length for the given processing mode which was set by execution of the vector length setting processing instruction at an exception level higher than the given exception level. However, significantly, in some embodiments the first processing circuitry is configured to execute the mode change instructions at any exception level of the hierarchy of exception levels. The combination of these features allows code executing at a lowest exception level, such as a so-called EL0 level in some practical examples, to initiate the change processing mode even though it cannot itself set the maximum vector length in either of the first and second processing modes.

The disclosure may be embodied as a CPU and co-processor arrangement, with the CPU providing the first processing circuitry and the co-processor providing the second processing circuitry. In other examples, a single CPU may provide the first and second processing circuitries and associated sets of vector registers. In either situation, the disclosure encompasses an apparatus which also provides one or more second vector registers having the second vector length; and second processing circuitry configured to execute the decoded vector processing instructions in accordance with a vector length no greater than the second vector length.

In the second processing mode, there is not a prohibition on the first processing circuitry executing an instruction. For example, a scalar instruction may be most appropriately executed by the first processing circuitry even when the apparatus is operating in the second processing mode. In order to handle routing of such instructions correctly, in example embodiments the control circuitry is configured to detect, in the second processing mode, whether a given processing instruction is executable by the first processing circuitry or the second processing circuitry.

The present disclosure lends itself very effectively to operation in which two or more connected CPUs share a common co-processor, for example by providing successive instructions for handling by the co-processor which are then queued for execution (such as so-called streaming execution) by the co-processor. In such arrangements, the apparatus may comprise two or more instances of first processing circuitry; in which the instruction decoder of each instance of the first processing circuitry is configured to selectively route second vector processing instructions to a common second processing circuitry.

As mentioned, in some examples, the vector processing instructions themselves may be agnostic with respect to the vector length defined by the current processing mode, for example using SVE/SVE2 technology as discussed above.

In some example arrangements, the apparatus comprises vector length register storage configured to store a vector length no greater than the first vector length, for use in the first processing mode, and to store a vector length no greater than the second vector length, for use in the second processing mode the second vector length, the instruction decoder being configured to access the vector length storage in dependence upon the current processing mode.

In an example arrangement in which memory address translation is use, the apparatus may comprise a data memory; and address translation circuitry to translate between input memory addresses in an input memory address space and output memory addresses in an output memory address space, the data memory being accessible according to the output memory address space. Advantageously, the control circuitry may be configured, in the second processing mode, to initiate translation of an input memory address associated with a processing instruction for execution by the second processing circuitry and to provide a translated output memory address to the second processing circuitry. This can avoid the need for memory address translation to be performed by the second processing circuitry.

While there is no fundamental requirement for the first and second processing circuitries to have different native or inherent vector lengths, in some examples the second vector length is different to the first vector length. For example, the second vector length may be greater than the first vector length.

Another example embodiment provides a method comprising:
decoding processing instructions;
executing the decoded processing instructions in a first processing mode in which the processing circuitry is configured to execute the decoded processing instructions using one or more first registers; and
selectively initiating execution of the decoded processing instructions in a second processing mode in which the decoded processing instructions are selectively executed using one or more second registers;
the decoding step comprising decoding processing instructions selected from a first instruction set in the first processing mode and processing instructions selected from a second instruction set in the second processing mode, in which one or both of the first and second instruction sets comprises at least one instruction which is unavailable in the other of the first and second instruction sets;
the decoding step comprising decoding one or more mode change instructions to change between the first processing mode and the second processing mode; and
the executing step comprising changing the current processing mode between the first processing mode and the second processing mode in response to execution of a mode change instruction.

Another example embodiment provides a computer program for controlling a host data processing apparatus to provide an instruction execution environment comprising:
an instruction decoder to decode processing instructions;
one or more first registers;
first processing circuitry to execute the decoded processing instructions in a first processing mode in which the first processing circuitry is configured to execute the decoded processing instructions using the one or more first registers; and
control circuitry to selectively initiate execution of the decoded processing instructions in a second processing mode in which the decoded processing instructions are selectively executed using one or more second registers;
the instruction decoder being configured to decode processing instructions selected from a first instruction set in the first processing mode and processing instructions selected from a second instruction set in the second processing mode, in which one or both of the first and second instruction sets comprises at least one instruction which is unavailable in the other of the first and second instruction sets;
the instruction decoder being configured to decode one or more mode change instructions to change between the first processing mode and the second processing mode; and the first processing circuitry being configured to change the current processing mode between the first processing mode and the second processing mode in response to execution of a mode change instruction.

Example Apparatus

Referring now to the drawings, FIG. 1 schematically illustrates a data processing apparatus 100 comprising one or more central processing units (CPUs) or processing elements 110, 120, 130, a memory management unit (MMU) 140 and a co-processor 150, all connected to an interconnect 160 to which a main memory sub-system 170 is also connected.

In operation, each CPU can execute program instructions, which may be, for example, loaded from the memory sub-system 170 and optionally stored in one or more local caches. A CPU can also refer instructions for execution by the co-processor 150. Techniques for selectively providing local execution (at the CPU) and remote execution (at the co-processor) will be discussed below.

Using techniques to be described below, FIG. 1 therefore provides an example of two or more instances 110, 120, 130 of first processing circuitry; in which an instruction decoder (to be described below) of each instance of the first processing circuitry is configured to selectively decode processing instructions, some of which may be routed for execution (using techniques below) to a common second processing circuitry 150.

Memory Address Translation

A function of the MMU 140 is to provide address translations between an input memory address in an input memory address space (such as a virtual address, VA, in a VA space) and an output memory address in an output memory address space (such as a physical address, PA, in a PA space). A reason for providing memory address translation is so that the CPUs and/or different threads or processes executing on the CPUs can be isolated so that they each operate according to a respective VA space in which the virtual addresses do not give direct access to the data physically stored by the memory sub-system 170. A higher level control process such as an operating system or a hypervisor has control over the address translation and in this way can provide for security and isolation between the different CPUs, threads or processes is so as to inhibit one CPU, thread or process from accessing data which is the property of (for which access is reserved to) another CPU, thread or process.

Figure 2:
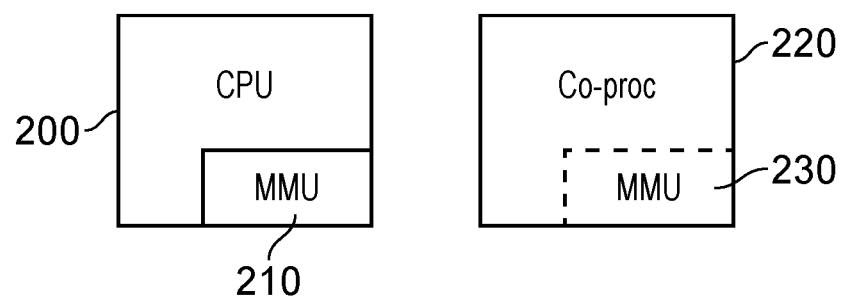
FIG. 2 schematically illustrates the use of devices having dedicated memory management units.

The use of a separate MMU 140 is shown in FIG. 1 is just one option. As shown schematically in FIG. 2, a CPU 200 may have its own MMU functionality 210. Similarly, a co-processor 220 may have its own MMU functionality 230. In other examples, a CPU, when initiating execution of an instruction by the co-processor, may itself obtain any required address translations and provide translated output memory addresses (such as physical memory addresses) to the co-processor.

The examples above have referred to a single-stage memory address translation process, purely by way of example. However, it is possible to employ more than one stage of memory address translation, for example translating from a VA to an intermediate physical address (IPA) and from there to a PA. One reason why this multiple stage address translation may be used in some examples is to allow a first translation stage to be controlled by, for example, an operating system and a second stage to be controlled by, for example, a process which oversees potentially multiple operating systems such as a hypervisor.

The present techniques are applicable to any of these memory address translation scenarios.

Example CPU

Figure 3:
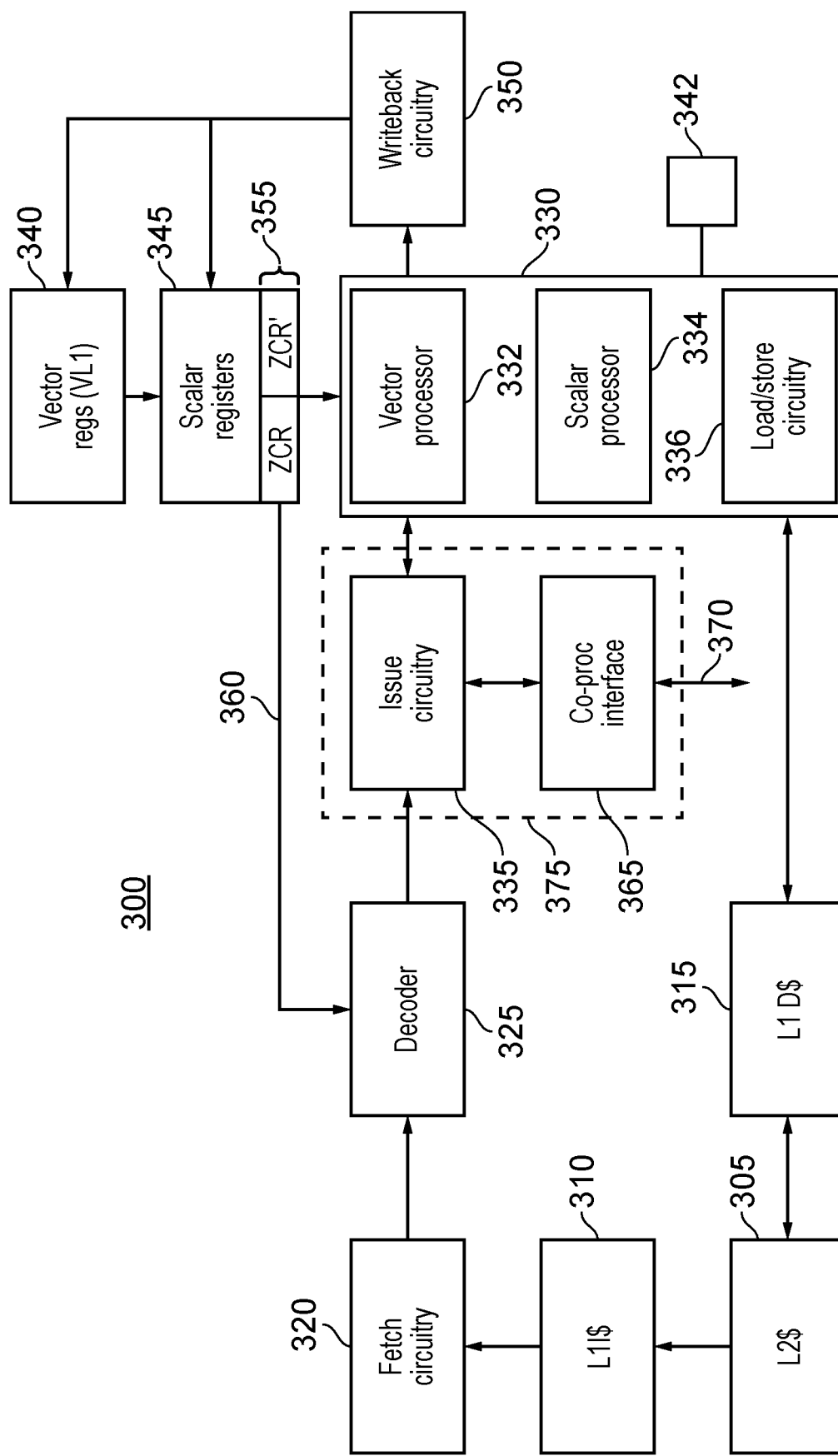
FIG. 3 schematically illustrates a data processing device.

FIG. 3 is a schematic diagram illustrating an example 300 of one of the CPUs 110 . . . 130.

The CPU is capable of scalar processing and vector processing.

A general distinction between scalar processing and vector processing is as follows. Vector processing involves applying a single vector processing operation to a plurality of data items of a data vector, each data item having a respective position in the data vector. Scalar processing, by contrast, operates on (effectively) single data items rather than vectors.

Vector processing can be useful in situations where the same or similar processing is carried out on many different instances of data items. In a vector processing arrangement, a single processing instruction can be applied to multiple data items of a data vector, which may be effectively at the same time (though it is often left to the hardware designer as to whether to implement simultaneous or sequential execution). This can improve the efficiency and/or throughput of a processing arrangement compared to scalar processing.

Referring to FIG. 3, a level 2 cache 305 interfaces (307) with the memory sub-system 170 via the interconnect 160. A level 1 instruction cache 310 provides a more localised cache of processing instructions and a level 1 data cache 315 provides a more localised cache of data to be retrieved from or stored to the memory sub-system.

Fetch circuitry 320 fetches program instructions from the memory sub-system 170 via the various caches as drawn and provide fetched program instructions to decoder circuitry 325. The decoder circuitry 325 decodes the fetched program instructions and generates control signals to control an execution unit 330 to perform processing operations in at least a first mode of operation.

The reference to a first mode of operation will now be discussed.

In general terms, the apparatus of FIG. 3 is operable in a first processing mode in which the execution unit 330 (as an example of first processing circuitry) is configured to execute the decoded processing instructions provided by the decoder circuitry 325.

In a second processing mode, further (second) processing circuitry, not shown in FIG. 3, is used for at least a part of the execution of the decoded processing instructions. For example, the second processing circuitry may be provided at the co-processor 150 and will be discussed below.

First Processing Mode

In the first processing mode, the decoder circuitry 325 provides decoded processing instructions of a first instruction set to issue circuitry 335 which controls the issue of the decoded instructions to the execution unit 330 which in turn comprises a vector processor 332, a scalar processor 334 and load/store circuitry 336. It will be appreciated that other users or circuitries may be provided as part of the functionality of the execution unit 330 but these are not shown here for clarity of the diagram.

The vector processor 332 executes decoded vector processing instructions using one or more vector registers 340 having a first vector length VL1. The scalar processor 334 executes decoded scalar processing instructions using one or more scalar registers 345. In either case, the vector processor 330 or the scalar processor 334 can receive values from the respective registers and can write back to the registers via writeback circuitry 350. Where there is a requirement to retrieve data from the memory sub-system 170 or to store data to the memory sub-system 170, this is performed by the load/store circuitry 336, via the cache arrangements as drawn. Previously proposed coherency techniques can be applied by a coherency controller (not shown), for example implemented as part of the interconnect 160.

A set of one or more "ZCR" registers 355 is provided as part of the set of scalar registers 345. Using techniques to be described below, the ZCR registers provide a prevailing vector length 360 to the decoder 325 for use in decoding the fetched instructions. The fetched instructions themselves are "vector length agnostic", for example complying with the so-called "Scalable Vector Extension" (SVE) or the SVE2 architectures defined by Arm Ltd. That is to say, the program code itself is operable on hardware having a vector length selectable amongst at least a set of supported vector lengths such that the same program code will operate on different hardware having different examples of such vector lengths. However, the actual vector length available to the hardware on which a decoded instruction is to be executed is required for decoding of that instruction into the appropriate control signals to control execution.

Second Processing Mode

In the second processing mode, at least some of the operations required to execute a decoded instruction of a second instruction set (which does not entirely coincide with the first instruction set, which is to say that at least one of the first and second instruction sets contains instructions not available in the other of the instruction sets) are carried out by second processing circuitry such as the co-processor 150.

It is not a requirement of the second processing mode that a particular instruction cannot be entirely executed by the first processing circuitry. The second processing mode allows instructions to be routed to the first or the second processing circuitry as appropriate. For example, a scalar instruction may still, notwithstanding the second processing mode, be executed entirely at the connected CPU. However, it is only in the second processing mode that instructions can be routed to the second processing circuitry, for example at the co-processor.

In this arrangement, the decoder circuitry 325 receives the vector length from an alternate register or register field (shown schematically as ZCR' in FIG. 3 indicating a vector length appropriate to the second processing circuitry. Note that this could be (but does not have to be) different to the vector length associated with the first processing circuitry and the execution unit 330, and in some examples could be greater than that of the first processing circuitry. In such an arrangement, the hardware vector lengths VL1, VL2 associated with the first and second processing circuitries could be different and/or the maximum vector lengths allowed by the respective ZCR registers could also be different. The decoder circuitry 325 decodes the fetched instructions in the second processing mode but instead of simply routing them to the execution unit 330, the issue circuitry 335 interfaces with a co-processor interface 365 which communicates 370 via the interconnect 160 with the coprocessor 150.

It should be noted that the use of the second processing mode does not entirely preclude some contributory operations being carried out at the CPU 300 itself, even when execution of the instruction is referred to the co-processor.

In an example, the CPU 300 could interface with the memory management unit 140 or its own MMU 210 if provided (though not shown in FIG. 3 for clarity of the diagram) to obtain any required memory address translations for execution of an instruction by the co-processor, and include these within a communication with the co-processor.

In another example, the co-processor could generate a result such as a scalar value or a condition code which is provided back to the CPU 300 via the co-processor interface 365 for writing to a scalar register, a condition flag or the like.

In another example, the CPU 300 could undertake some operations to prepare one or more operands for the co-processor to act upon.

In this regard, the handling of any necessary operations at the CPU 300 and the transmission of a message defining the required instruction to the coprocessor are handled by the issue circuitry 335 and the coprocessor interface 365 which therefore together provide the functionality of control circuitry 375 to selectively initiate execution of a decoded processing instruction in the second processing mode in which the decoded processing instructions may be executed using (wholly or at least partly) the second processing circuitry having one or more second vector registers in accordance with a second vector length, for example the vector length defined by the register fields ZCR'. Operation of the circuitry 375 can be in response to information provided by the decoder circuitry and/or in response to a current state of an SM bit or field to be discussed below.

The ZCR and ZCR' registers or fields provide an example of vector length register storage configured to store a vector length no greater than the first vector length, for use in the first processing mode, and to store a vector length no greater than the second vector length, for use in the second processing mode the second vector length, the instruction decoder being configured to access the vector length storage in dependence upon the current processing mode.

In summary, therefore, FIG. 3 provides an example of apparatus comprising:

an instruction decoder 325 to decode processing instructions potentially including vector processing instructions;

one or more first registers 340, such as vector registers 340 having a first vector length VL1;

first processing circuitry 330 to execute the decoded processing instructions in a first processing mode in which the first processing circuitry is configured to execute the decoded processing instructions using the one or more first registers, for example (where they are vector registers) in accordance with a vector length no greater than the first vector length; and control circuitry 375 to selectively initiate execution of the decoded processing instructions in a second processing mode in which the decoded processing instructions are selectively executed using one or more second registers such as second vector registers, for example in accordance with a vector length no greater than a second vector length;

the instruction decoder 325 being configured to decode processing instructions selected from a first instruction set in the first processing mode and processing instructions selected from a second instruction set in the second processing mode, in which one or both of the first and second instruction sets comprises at least one instruction which is unavailable in the other of the first and second instruction sets;

the instruction decoder 325 being configured to decode one or more mode change instructions (Mstart, Mstop, discussed below) to change between the first processing mode and the second processing mode; and the first processing circuitry being configured to change the current processing mode between the first processing mode and the second processing mode in response to execution of a mode change instruction.

Note that the underlying techniques, in which different capabilities such as potentially different registers and different or at least not-completely-overlapping instruction sets are provided in the first and second modes, apply whether or not the processing instructions are vector instructions, and whether or not the registers are vector registers, matrix registers or scalar registers.

Exception Levels

The CPU 300 in the present examples is operable to execute processing instructions and a prevailing exception level of a hierarchy of exception levels each having a respective level of privilege to access processing resources associated with the CPU 300.

In an example, four exception levels EL0 ... EL3 may be provided, with privilege for accessing processing resources increasing with the increasing numerical value n of the ELn designation, so that EL3 has higher privilege than EL2 and so on. The current level of privilege can only change when the CPU 300 takes or returns from an exception. In an example arrangement, application code may operate at EL0, an operating system at EL1, a hypervisor at EL2 and secure firmware at EL3. However this is simply an illustrative example. The term "privilege" may refer to privilege to access the memory system, and in the examples given may encompass privilege to vary the translation information used by the MMU 140, and/or privilege to access other processing resources such as processing registers.

This arrangement therefore provides an example in which the first processing circuitry is operable to execute processing instructions at a prevailing exception level of a hierarchy of exception levels each having a respective level of privilege to access processing resources of the apparatus.

Hardware-Supported Vector Lengths

While in principle it could be possible to implement a system which allows any physical (hardware) vector length, in the present examples the physical vector length is constrained to be a multiple of 128 bits up to a maximum of 2048 bits. In some examples, the hardware is required only to support multiples of 128 bits which are related as powers of two, which is to say $128 \times 2^n$. However, at a general level, it may be assumed that in at least some embodiments there is a set of permissible vector lengths and also a maximum vector length which may be supported by the hardware. A particular example of hardware may of course have a single associated physical vector length (for example, 256 bits).

ZCR Registers

Figure 4:
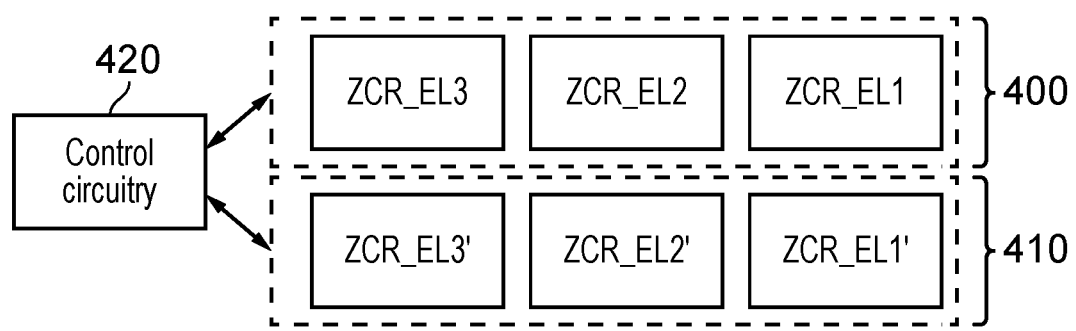
FIGS. 4 and 5 schematically illustrate the storage of vector length registers.
Figure 5:
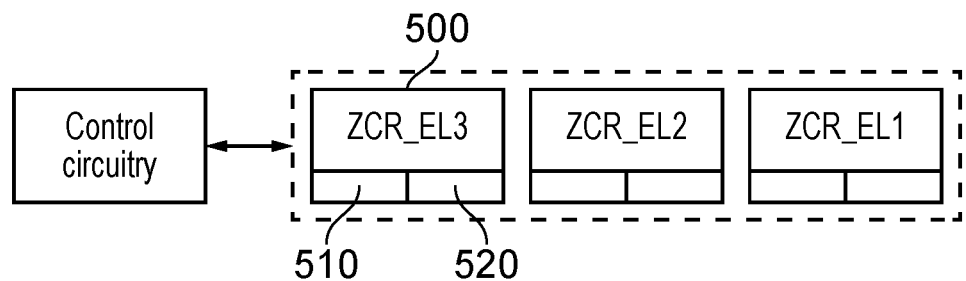

FIGS. 4 and 5 provide schematic examples of the ZCR registers 355 of FIG. 3. In general terms, a ZCR register is provided for each of EL1, EL2 and EL3. ZCR_EL3 is a control register to control the accessible vector length at EL3, EL2, EL1 and EL0. ZCR_EL2 is a control register to control the accessible vector length at EL2 and so-called non-secure EL1 and EL0. ZCR_EL1 is a control register to control the accessible vector length at EL1 and EL0. In each case, the second part of the register name indicates the level of privilege or exception level required to change the contents of the register, so that for example ZCR_EL3 requires exception level EL3 to be altered.

These ZCR registers are hierarchical, so that ZCR_EL2 cannot select a vector length longer than that defined by ZCR_EL3, and similarly ZCR_EL1 cannot select a vector length longer than that defined by ZCR_EL2 if EL2 is implemented and enabled in the same security state as EL1 (which may be controlled by the SCR_EL3.EEL2 control). Also note that EL2 and EL3 are in fact optional for a given implementation, so the EL2/EL3 constraints only apply if those exception levels are implemented.

In other words, the first processing circuitry is configured to execute the vector length setting processing instruction at a given exception level to set a vector length for use in a given processing mode no higher than the maximum vector length for the given processing mode which was set by execution of the vector length setting processing instruction at an exception level higher than the given exception level.

In the example of FIG. 4, two sets of the ZCR registers are provided, one set 400 being applicable to the first processing mode and one set 410 being applicable to the second processing mode, with appropriate control circuitry 420 routing the required values to and from the appropriate registers. In the example of FIG. 5, each register 500 has two fields 510, 520 storing the relevant values for the first processing mode or the second processing mode.

The ZCR registers may be populated with hardware-supported vector lengths using a technique to be discussed with reference to FIG. 6.

In an SVE/SVE2 processor of the type shown in FIG. 3, the instruction set itself is vector length agnostic but the ZCR registers are populated by steps including querying the hardware to find out the actual vector length implemented by the physical circuitry in which instructions are to be run. As mentioned above, the vector length defined by the ZCR register applicable to the current exception level is used by the decoding process to decode the fetched program instructions.

Figure 6:
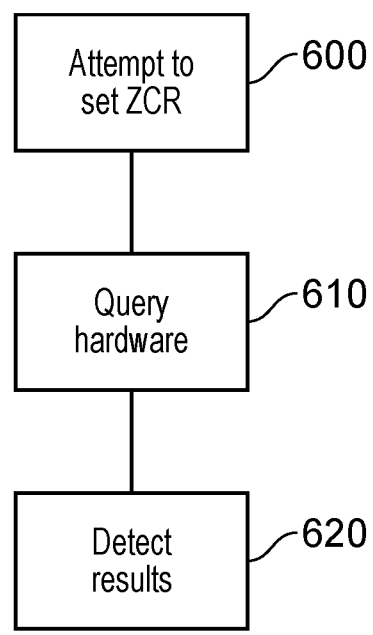
FIG. 6 is a schematic flowchart illustrating a method.

The process of FIG. 6 may be followed at each exception level in turn, starting at the highest exception level EL3 down to EL1. Here, note that instructions executed at EL0 cannot alter any of the ZCR registers themselves but can detect the effect of at least the ZCR_EL1 registers on the available vector length.

At a step 600, a program instruction is executed to write a value to the relevant ZCR register (ZCR_EL3 assuming that the process is run first in EL3). This could be, for example, the maximum vector length mentioned above (for example, 2048 bits). Then, at a step 610 the hardware is queried, for example by executing a RDVL (read vector length) instruction to detect the effect of the same ZCR register on the available vector length. This prompts the hardware to write to the destination register of that instruction a vector length which it is capable of supporting and which is as near as possible to but no greater than the vector length which was written to the ZCR_EL3 register. In this way, program code can detect the results of the process at a step 620 in terms of detecting at least one allowable vector length which can be used. The process can be carried out iteratively at a particular exception level so as to populate a set of one or more vector lengths which are permissible with the current hardware. This process can be carried out, for example, at boot of the apparatus.

Once the set of one or more hardware-supported vector lengths has been derived in this way, the register ZCR_EL3 can then be populated with one of the permissible vector lengths.

The list of hardware-supported vector lengths is a fundamental property of the design of the first and second vector processors and their vector register files. The co-processor might communicate its set of supported vector lengths to the CPU, or it could be fixed and known to both CPU and coprocessor.

The RDVL instruction does not alter the ZCR value itself, it only returns the vector length that has been selected by the ZCR_ELn registers (or the highest hardware-supported value compatible with it). ZCR is written by a separate MSR (move to system register) instruction. In practice when ZCR_ELn is written, or when the exception level changes due to taking an exception or exception return causing a different set of ZCR registers to apply, a new vector length (VL) may be calculated and saved in internal CPU storage that gets used by the CPU decoder and be returned by RDVL.

The processing underlying the RDVL instruction could therefore, for example, include the following. The hardware has available to it information (for example, as hard-coded storage 342 or as part of the functionality of the vector registers themselves) indicating the hardware-supported vector length or lengths at which the hardware may operate. The execution of the RDVL instruction prompts the execution unit 330 to detect the hardware vector length from this source and, taking into account the value held by the relevant ZCR register, to set VL for current use to a value which is as high as possible while being compatible with that information and with the value previously written to that ZCR register, and to return the value as set.

Once this has all happened, a similar process can be performed for ZCR_EL2 resulting in the population of that register with a permissible vector length no higher than that held by ZCR_EL3. Once again, the process can be performed for ZCR_EL1.

In this way, in subsequent normal operation following the initialisation processes discussed above, the ZCR_ELn registers or register fields contain respective hardware-supported vector lengths.

Figure 11:
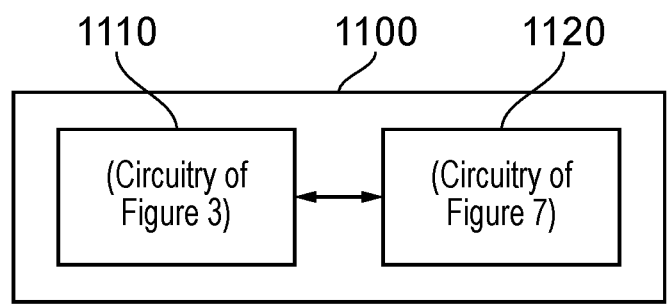
FIG. 11 schematically illustrates a composite apparatus.

The alternate fields or registers ZCR_ELn' can be populated by a similar technique, but operating in the second processing mode, in which mode the hardware responses may come from the second processing circuitry such as the co-processor rather than from the first processing circuitry (the execution unit 330) and will reflect the vector length of vector registers to be discussed below and other hardware capabilities which are associated with the second processing circuitry. The hardware capabilities of the second processing circuitry could be stored (similar to or as part of 342) at the first processing circuitry, where the first and second processing circuitries are implemented in common, for example as shown in FIG. 11 discussed below or as a common system-on-chip (SoC) or network-on-chip (NoC) or could be obtained by querying a similar hardware storage at the co-processor in the case of a discrete co-processor.

FIG. 6 therefore provides an example in which the first processing circuitry is configured to detect a vector length for execution of instructions in the first processing mode and a vector length for execution of instructions in the second processing mode by executing a vector length detection processing instruction.

The setting of the ZCR registers, for example as discussed above at the conclusion of the process of FIG. 6, provides an example in which the first processing circuitry is configured to execute a vector length setting processing instruction at an exception level other than a lowest exception level, to set a maximum vector length applicable to that exception level and at least one lower exception level. This is also an example in which the first processing circuitry is configured to execute the vector length setting processing instruction to set a vector length for use in the first processing mode to be no higher than the first vector length and to set a vector length for use in the second processing mode to be no higher than the second vector length.

Example Co-Processor

Figure 7:
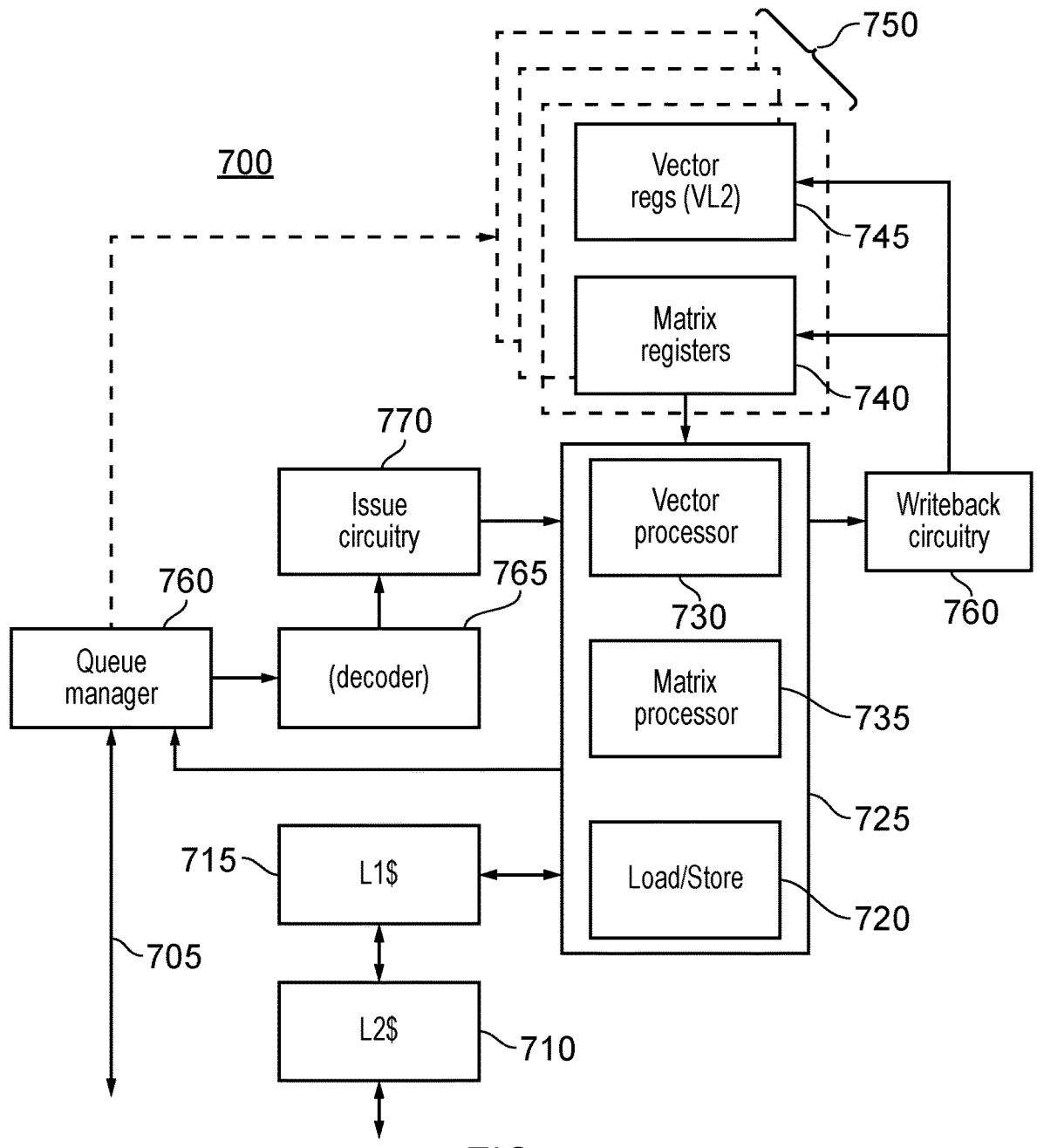
FIG. 7 schematically illustrates a data processing device.

FIG. 7 schematically illustrates an example 700 of a co-processor such as the co-processor 160. The co-processor communicates 705 with one or more connected CPUs 110 . . . 130 via the interconnect and also provides level 2 and level 1 caches 710, 715 associated with load/store circuitry 720 to provide communication with the memory sub-system. Note that in some embodiments, and depending on the design of the overall system, some of the caches such as the level 2 cache could be shared between a CPU (the CPU if only one is provided) and the co-processor.

Second processing circuitry 725 comprises, in this example, a vector processor 730, a matrix processor 735 and the load/store circuitry 720. It is associated with matrix registers 740 and vector registers 745 having a physical vector length VL2 which may be the same or different to VL1 of the first processing circuitry. In some examples, VL2 may be larger than VL1.

Generally speaking, a respective set 750 of the registers 740, 745 is provided at the co-processor 700 for each of the connected CPUs, which allows interleaved instructions to be executed on behalf of different CPUs without the need to write back register contents to the main memory (which would generally be expected to be a slow process in comparison to the time taken to execute the instructions received from the connected CPUs).

Writeback circuitry 760 controls the writing back of results from the second processing circuitry 725 to the registers 740, 745.

Example of First and Second Instruction Sets

The matrix processor 735 executes specialised matrix processing instructions which are in this example not available for execution by the execution unit 330 of the CPU. Similarly, some instructions which can be executed by the CPU are not available for execution by the second processing circuitry 725, for example gather-load and scatter-store vector operations and/or some scalar operations which can be adequately and efficiently carried out at the connected CPU. This provides an example in which the instruction decoder is configured to decode processing instructions selected from a first instruction set in the first processing mode and processing instructions selected from a second instruction set in the second processing mode; and one or both of the first and second instruction sets comprises at least one instruction which is unavailable in the other of the first and second instruction sets. In examples in which the second processing circuitry comprises matrix processing circuitry, the second instruction set may comprise one or more matrix processing instructions which are unavailable in the first instruction set.

Queuing and Streaming

Communication from a connected CPU is handled by a queue manager 760 which receives information defining instructions required to be executed for a particular CPU and forms a queue of such instructions associated with the identity of the connected CPU which requested the instruction. When an instruction reaches an appropriate stage in the queue, it is passed to optional decoder circuitry 765. This is referred to as "optional" because in some examples the entirety of the decoding process may take place at the connected CPU so that the information communicated to the co-processor is in an already-decoded form, but in other examples at least a partial stage of decoding may be required at the co-processor. From there, control signals are passed to issue circuitry 770 to control issuing of the instructions to the second processing circuitry 725.

In many example instances, apart from a handshaking interaction to confirm successful receipt and queueing of an instruction from a connected CPU, there is no need for further interaction. That is to say, the co-processor can be instructed by a connected CPU to retrieve information from memory or a register, to perform a particular operation on it and to store the results to a register or to memory. As long as this instruction is completed before commitment of a subsequent instruction which may depend upon it, there is no need to provide any further information back to the connected CPU which requested the instruction. In this way, operation of the connected CPU to provide instructions to the co-processor can be referred to as a so-called "streaming mode" in that successive instructions can be communicated to the co-processor with the only interaction being a handshake to indicate successful receipt and enqueueing.

Of course, however, it is possible to envisage execution of instructions by the co-processor which generate results which need communicating back to the connected CPU which requested that execution. Examples may include extracting a single scalar value from a vector or matrix held at the co-processor and provided back to the connected CPU which requested the instruction, or generating a condition code which is also provided back to the connected CPU which requested the instruction. This type of reverse interaction can also be handled by the queue manager which can represent an interface with the connected CPUs via the interconnect 160.

One or both of the queue manager 760 and the issue circuitry 770 can control which of the sets 750 of registers is enabled for a particular instruction execution by the second processing circuitry 725, so that the appropriate set applicable to the connected CPU which requested the instruction execution is used.

FIG. 7 therefore provides an example illustrating one or more second vector registers 745 (750) having the second vector length; and second processing circuitry 725 configured to execute the decoded vector processing instructions in accordance with a vector length no greater than the second vector length.

Example of Communication Between the Connected CPU and the Co-Processor

The connected CPU can provide at least some of the following information to the co-processor, for example in the form of a data handling transaction or packet addressed to the co-processor:
- identity of connected CPU (to allow selection of the correct set of registers at the co-processor, to allow for queue arbitration and/or to provide a return address for handshaking or response signals)
- identity of co-processor (if there is any possible ambiguity)
- identity of instruction to be executed (may be an opcode to be at least partly decoded at the co-processor; may be in a decoded form) identity and/or values of one or more operands (for example, one or more PAs; one or more VAs or IPAs for which the co-processor will need to obtain translation; the identity of one or more co-processor registers)
- values of selected scalar registers required by the instruction As discussed above, the CPU can provide translated PAs to the co-processor, which can avoid the need for the co-processor itself to have MMU functionality or to initiate actions by a separate MMU. This provides an example in which the apparatus provides a data memory 170; and address translation circuitry 140, 210 to translate between input memory addresses in an input memory address space and output memory addresses in an output memory address space, the data memory being accessible according to the output memory address space; in which the control circuitry 375 is configured, in the second processing mode, to initiate translation of an input memory address associated with a processing instruction for execution by the second processing circuitry and to provide a translated output memory address to the second processing circuitry.

Switching Between First and Second Processing Modes

A pair of instructions are provided for execution at the CPU at any exception level (from EL0 upwards) to switch between the first and the second processing mode. In other words, the first processing circuitry is configured to execute the mode change instructions at any exception level of the hierarchy of exception levels. These instructions are:

Mstart: this switches operation to the second processing mode, which is to say that the execution unit 330 does at least the following in response to the Mstart instruction:
- sets a "streaming mode" (SM) control bit, register or field (for example at the decoder or at the execution unit or in the scalar registers such that it can be referred to by various units of the CPU) to indicate the second processing mode
- selects use of the ZCR_ELn' variant of the ZCR registers/fields enables the instruction set associated with the second processing circuitry
- controls the decoder circuitry 325 to decode instructions of that instruction set into suitable control signals to be forwarded to the second processing circuitry
- controls the control circuitry 375 to selectively initiate execution of decoded instructions by the second processing circuitry Mstop: this switches operation to the first processing mode, which is to say that the execution unit 330 does at least the following in response to the Mstop instruction:
- unsets the "streaming mode" (SM) control bit, register or field, to indicate the first processing mode.
- selects use of the ZCR_ELn variant of the ZCR registers/fields
- enables the instruction set associated with the first processing circuitry.
- controls the decoder circuitry 325 to decode instructions of that instruction set into suitable control signals to be issued to the first processing circuitry
- controls the control circuitry 375 to issue decoded instructions to the first processing circuitry As mentioned above, these instructions are executable at any exception level. Therefore, in contrast to the setting of the ZCR registers (which cannot be performed at EL0), these provide a technique available even at EL0 to potentially change the prevailing vector length at which instructions are executed.

Note that the changing from one vector length to another is not necessarily a change between the physical vector length VL1 and the physical vector length VL2 of the first and second processing circuitries, but is a change between the prevailing allowable vector length defined by the ZCR register for the first and second processing circuitries appropriate to the prevailing exception level.

Here, note that the exception level under discussion is a prevailing exception level at the particular connected CPU.

Figure 8:
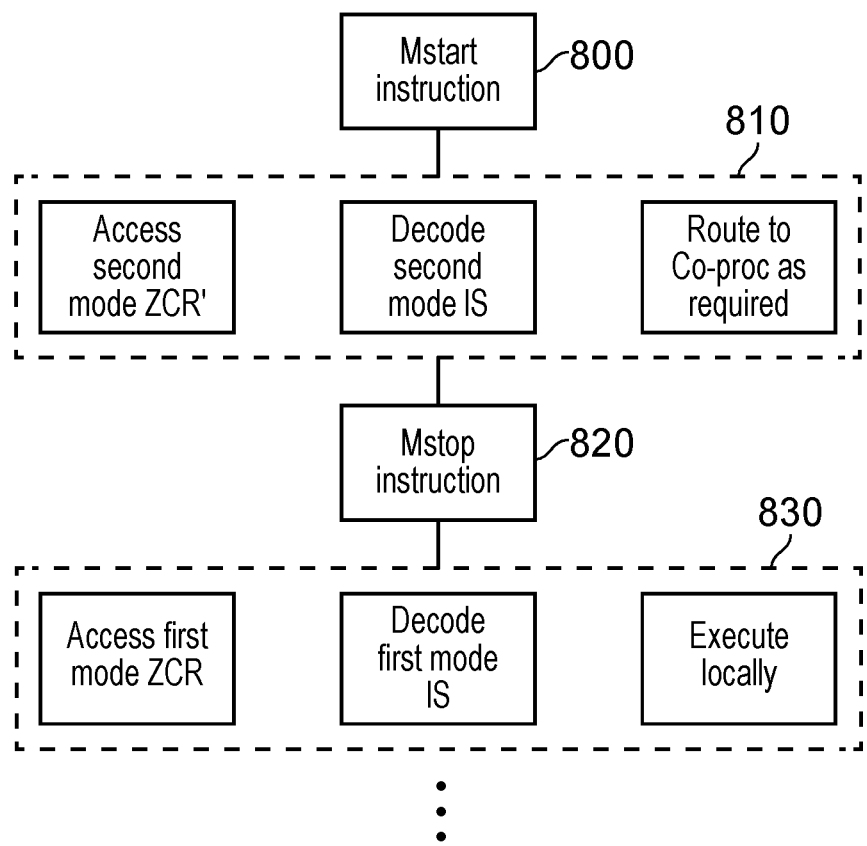
FIGS. 8 to 10 are schematic flowcharts illustrating respective methods.

The use of these instructions is summarised by a schematic flowchart of FIG. 8. Here, execution 800 of the Mstart instruction causes various outcomes 810, including accessing the second processing mode registers or register fields ZCR_ELn', decoding the second processing mode instruction set and, where appropriate, routing decoded instructions to the co-processor. Execution 820 of the Mstop instruction causes outcomes 830 including accessing the first processing mode registers or register fields ZCR_ELn, decoding the first processing mode instruction set and executing the decoded instructions at the first processing circuitry. The setting/unsetting of the SM bit also takes place as discussed above though is not shown in FIG. 8.

Example of Operation in the Second Processing Mode

Figure 9:
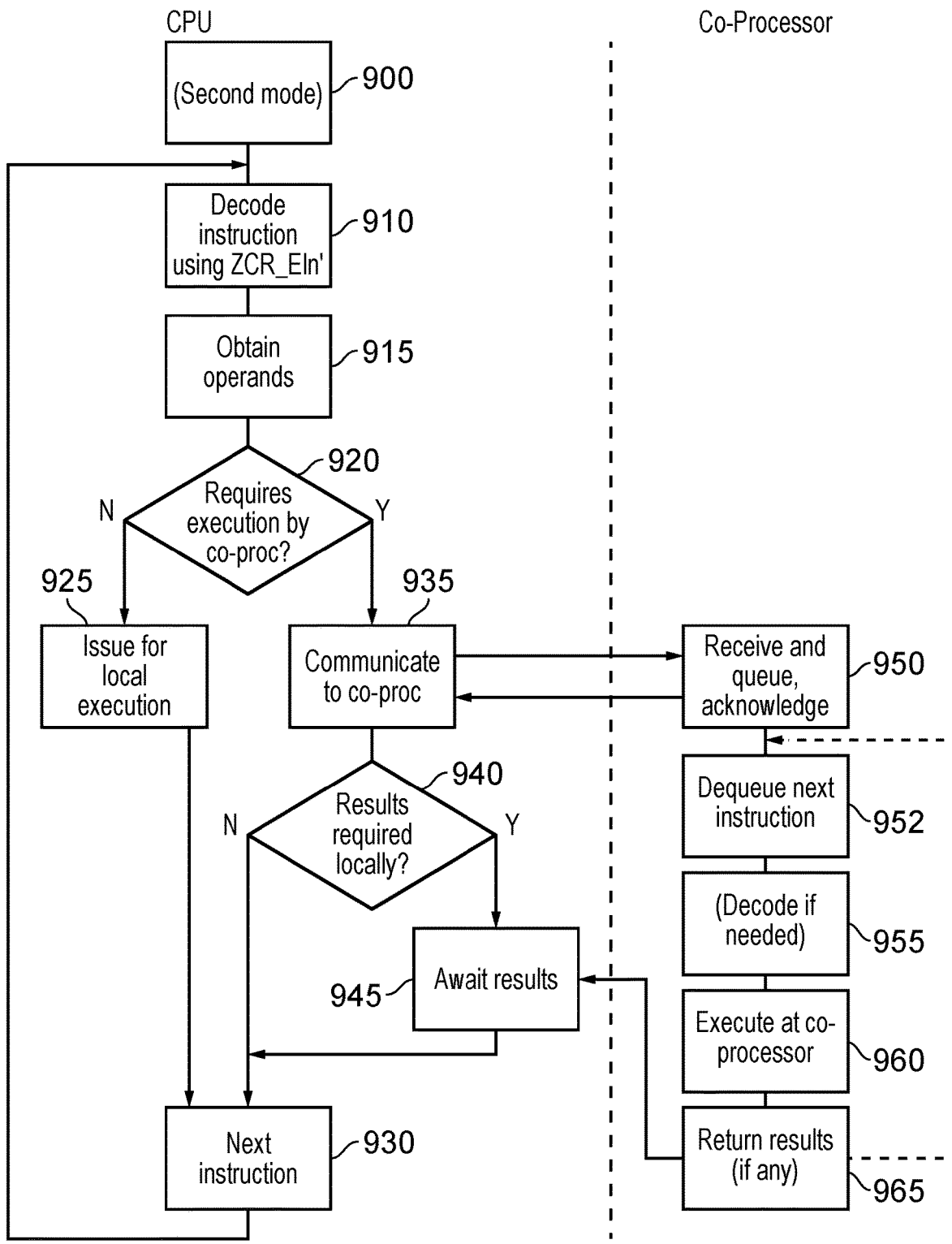

An example flowchart of FIG. 9 assumes a starting point 900 in the second processing mode, which is to say that the Mstart instruction has already been executed. The arrangement of FIG. 9 is such that operations by the connected CPU are shown schematically to the left of a broken line 905, and operations by the co-processor are shown to the right of the broken line 905 is drawn.

At a step 910, the decoder circuitry of the connected CPU decodes a next fetched instruction based upon the prevailing vector length appropriate to the prevailing exception level as defined by the register or register fields ZCR_ELn'. If necessary, at a step 915, the CPU obtains one or more operands relating to the decoded instruction.

Even in the second processing mode, it is possible that some instructions such as scalar instructions do not require execution by the co-processor. This relates to the terminology used of "selectively" initiating execution by the second processing circuitry. A detection of whether this is required is made at a step 920 (for example by comparing a current instruction with a predetermined set of instructions in this category) and, if not, control passes to a step 925 at which the instruction is issued for local execution by the first processing circuitry. Control passes to a step 930 which the process is repeated for a next instruction. This provides an example in which the control circuitry is configured to detect, in the second processing mode, whether a given processing instruction is executable by the first processing circuitry or the second processing circuitry.

If, however, at least part of the execution is required by the second processing circuitry, then control passes to a step 935 at which information defining the instruction is communicated to the coprocessor. A detection is made at a step 940 as to whether any results are required back at the connected CPU. If the answer is yes then the connected CPU stalls to await these results at a step 945 before passing control to the step 930. If the answer is no then control passes directly to the step 930.

The test performed at the step 940 relates to a simple mapping of types of instruction. Some instruction types will generate a result which is expected back at the connected CPU but some instruction types (instructions which are operable in the so-called streaming mode mentioned above) will not.

Turning to the operations at the co-processor, a step 950 involves receiving the communication from the connected CPU, enqueueing it and acknowledging it.

At a step 952, the next instruction is dequeued from the head of the queue and (at a step 955) is decoded or further-decoded if this is needed (as discussed above). At a step 960 the instruction is executed at the second processing circuitry. If no results are required to be sent back to the connected CPU then the process can end their at the co-processor but if results are required these are returned at a step 965. Control then returns to the step 952 to dequeue the next instruction in the queue.

Note therefore that the loop of 952 . . . 965 can operate independently of the step 950, that is to say in a streaming mode of operation as mentioned above, other than of course requiring at least some population of the queue from time to time by instances of the step 950. The execution at the co-processor by the loop 952 . . . 965 will continue to handle each instruction from the queue as long as the queue contains instructions (if the queue is empty then the step 952 will simply pause or stall until an instruction enters the queue). The step 960 will operate whenever a CPU communicates an instruction to the co-processor to join the queue.

Summary Method

Figure 10:
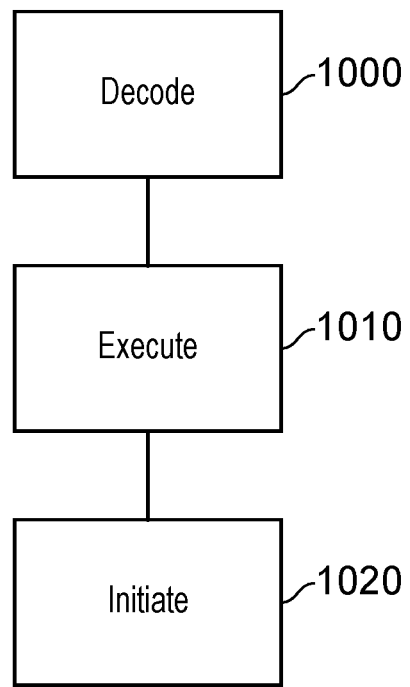

FIG. 10 is a schematic flowchart illustrating a method comprising:

decoding (at a step 1000) processing instructions;

executing (at a step 1010) the decoded processing instructions in a first processing mode in which the processing circuitry is configured to execute the decoded processing instructions using one or more first registers; and selectively initiating execution (at a step 1020) of the decoded processing instructions in a second processing mode in which the decoded processing instructions are selectively executed using one or more second registers;

the decoding step comprising decoding processing instructions selected from a first instruction set in the first processing mode and processing instructions selected from a second instruction set in the second processing mode, in which one or both of the first and second instruction sets comprises at least one instruction which is unavailable in the other of the first and second instruction sets;

the decoding step comprising decoding one or more mode change instructions to change between the first processing mode and the second processing mode; and the executing step comprising changing the current processing mode between the first processing mode and the second processing mode in response to execution of a mode change instruction.

Single CPU Embodiment

It is not a requirement that the second processing circuitry is implemented by a separate processing device such as the co-processor discussed above. It can in fact be provided by second processing circuitry embodied within a single CPU, which CPU therefore provides the first processing circuitry and the second processing circuitry, potentially having different associated vector lengths and differently sized vector registers.

FIG. 11 schematically illustrate such an arrangement in which a processing device or CPU 1100 comprises the circuitry 1110 of FIG. 3 connected to the circuitry 1120 of FIG. 7. In at least some examples, an interconnect of the type discussed above is not required, which is to say a direct connection could be used between the control circuitry of the circuitry of FIG. 3 and the queue manager of the circuitry of FIG. 7, but in other examples such as SoC or a NoC a form of the interconnect discussed above could be provided.

Note that in this embodiment there might not even be a "queue manager" arrangement; the second processing circuitry could be provided within the resources of the CPU and: some or all of the instructions associated with the second mode may simply be executed using the CPU vector processing resources, but using the second vector length (which might be the same as or different to the first vector length).

Simulator Embodiment

Figure 12:
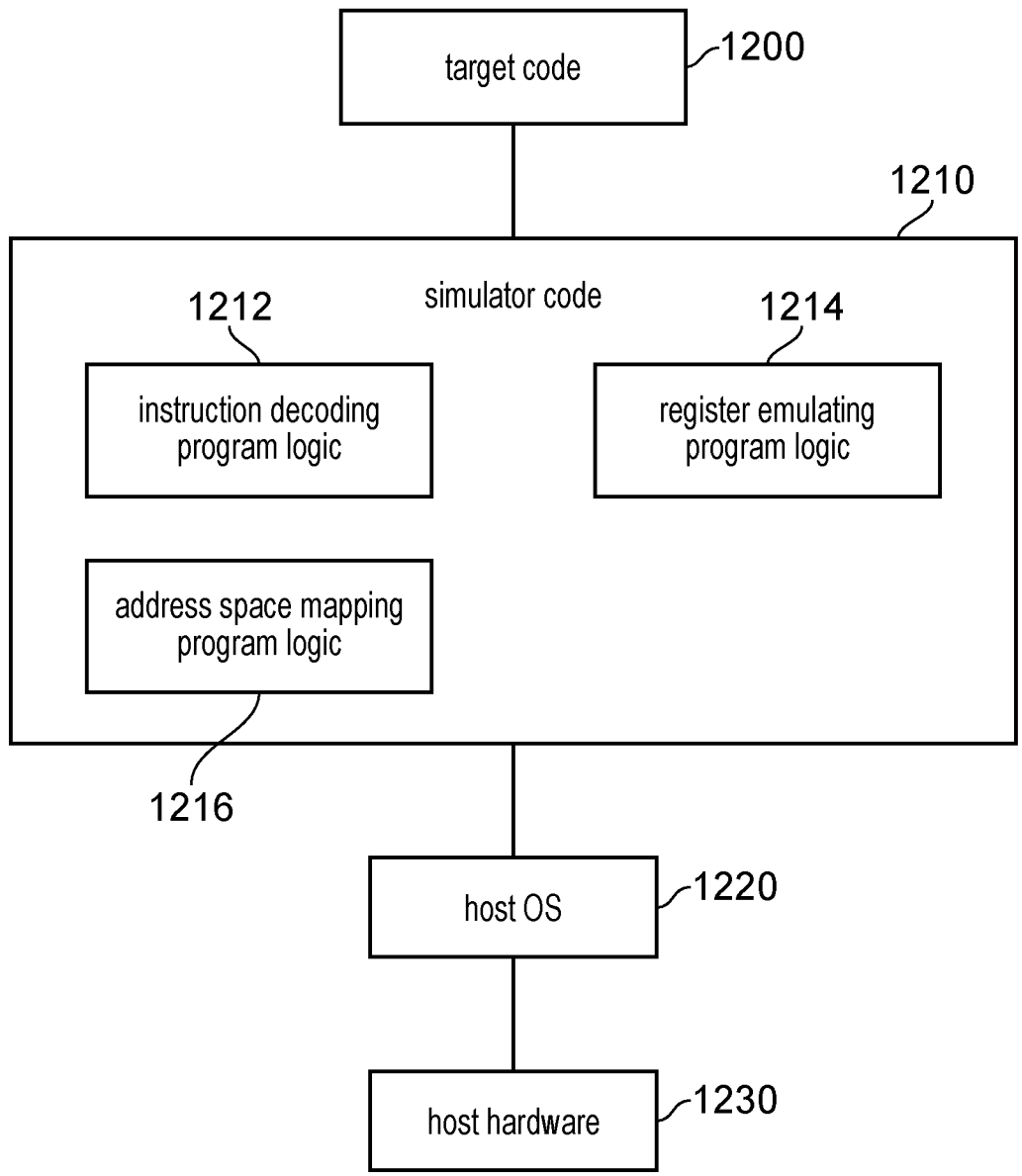
FIG. 12 schematically illustrates a simulator embodiment.

FIG. 12 illustrates a simulator implementation that may be used, in respect of the CPU alone as described above, or a combination of the CPU and the co-processor, or in terms of the arrangement of FIG. 11. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1230, optionally running a host operating system 1220, supporting the simulator program 1210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1230), some simulated embodiments may make use of the host hardware, where suitable.

The simulator program 1210 may comprise instruction decoding program logic 1212, register emulating program logic 1214 and address space mapping program logic 1216 for example and may be stored on a computer-readable storage medium (which may be a non-transitory medium), and provides a program interface (instruction execution environment) to the target code 1200 (which may include applications, operating systems and a hypervisor) which is the same as the application program interface of the hardware architecture being modelled by the simulator program 1210. Thus, the program instructions of the target code 1200, including the features described above, may be executed from within the instruction execution environment using the simulator program 1210, so that a host computer 1230 which does not actually have the hardware features of the apparatus discussed above can emulate these features.

The arrangement of FIG. 12, when used to simulate the operations described with reference to FIG. 3 for example, therefore provides an example of a computer program for controlling a host data processing apparatus to provide an instruction execution environment comprising:

an instruction decoder to decode processing instructions;
one or more first registers;
first processing circuitry to execute the decoded processing instructions in a first processing mode in which the first processing circuitry is configured to execute the decoded processing instructions using the one or more first registers; and
control circuitry to selectively initiate execution of the decoded processing instructions in a second processing mode in which the decoded processing instructions are selectively executed using one or more second registers;
the instruction decoder being configured to decode processing instructions selected from a first instruction set in the first processing mode and processing instructions selected from a second instruction set in the second processing mode, in which one or both of the first and second instruction sets comprises at least one instruction which is unavailable in the other of the first and second instruction sets;
the instruction decoder being configured to decode one or more mode change instructions to change between the first processing mode and the second processing mode; and
the first processing circuitry being configured to change the current processing mode between the first processing mode and the second processing mode in response to execution of a mode change instruction.

SUMMARY

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
an instruction decoder configured to decode processing instructions;
one or more first registers;
first processing circuitry configured to execute the decoded processing instructions in a first processing mode in which the first processing circuitry is configured to execute the decoded processing instructions using the one or more first registers; and
control circuitry configured to selectively initiate execution of the decoded processing instructions in a second processing mode in which the decoded processing instructions are selectively executed using one or more second registers;
the instruction decoder being configured to decode processing instructions selected from a first instruction set in the first processing mode and processing instructions selected from a second instruction set in the second processing mode, in which one or both of the first and second instruction sets comprises at least one instruction which is unavailable in the other of the first and second instruction sets;

the instruction decoder being configured to decode one or more mode change instructions to change between the first processing mode and the second processing mode; and the first processing circuitry being configured to change the current processing mode between the first processing mode and the second processing mode in response to execution of a mode change instruction, wherein the processing instructions include vector processing instructions;

the one or more first registers comprise one or more first vector registers having a first vector length;

the first processing circuitry is configured, in the first processing mode, to execute the decoded processing instructions using the one or more first vector registers in accordance with a vector length no greater than the first vector length; and in the second processing mode in which the decoded processing instructions are selectively executed using one or more second vector registers having a second vector length in accordance with a vector length no greater than the second vector length.

2. The apparatus of claim 1, in which the first processing circuitry is configured to execute processing instructions at a prevailing exception level of a hierarchy of exception levels each having a respective level of privilege to access processing resources of the apparatus.

3. The apparatus of claim 2, in which the first processing circuitry is configured to detect a vector length for execution of instructions in the first processing mode and a vector length for execution of instructions in the second processing mode by executing a vector length detection processing instruction.

4. The apparatus of claim 2, in which the first processing circuitry is configured to execute a vector length setting processing instruction at an exception level other than a lowest exception level, to set a maximum vector length applicable to that exception level and at least one lower exception level.

5. The apparatus of claim 4, in which the first processing circuitry is configured to execute the vector length setting processing instruction to set a vector length for use in the first processing mode to be no higher than the first vector length and to set a vector length for use in the second processing mode to be no higher than the second vector length.

6. The apparatus of claim 5, in which the first processing circuitry is configured to execute the vector length setting processing instruction at a given exception level to set a vector length for use in a given processing mode no higher than the maximum vector length for the given processing mode which was set by execution of the vector length setting processing instruction at an exception level higher than the given exception level.

7. The apparatus of claim 2, in which the first processing circuitry is configured to execute the mode change instructions at any exception level of the hierarchy of exception levels.

8. The apparatus of claim 2, comprising:
one or more second vector registers having the second vector length; and
second processing circuitry configured to execute the decoded vector processing instructions in accordance with a vector length no greater than the second vector length.

9. The apparatus of claim 2, in which the vector processing instructions are agnostic with respect to the vector length defined by the current processing mode.

10. The apparatus of claim 2, comprising vector length register storage configured to store a vector length no greater than the first vector length, for use in the first processing mode, and to store a vector length no greater than the second vector length, for use in the second processing mode the second vector length, the instruction decoder being configured to access the vector length storage in dependence upon the current processing mode.

11. The apparatus of claim 2, in which the second vector length is different to the first vector length.

12. The apparatus of claim 11, in which the second vector length is greater than the first vector length.

13. The apparatus of claim 1, in which the control circuitry is configured to detect, in the second processing mode, whether a given processing instruction is executable by the first processing circuitry or the second processing circuitry.

14. The apparatus of claim 1, comprising:
two or more instances of first processing circuitry;
in which the instruction decoder of each instance of the first processing circuitry is configured to selectively route processing instructions to a common second processing circuitry.

15. The apparatus of claim 1, in which the second processing circuitry comprises matrix processing circuitry and one or more matrix registers; and
the second instruction set comprises one or more matrix processing instructions which are unavailable in the first instruction set.

16. The apparatus of claim 1, comprising:
a data memory; and
address translation circuitry configured to translate between input memory addresses in an input memory address space and output memory addresses in an output memory address space, the data memory being accessible according to the output memory address space;
in which the control circuitry is configured, in the second processing mode, to initiate translation of an input memory address associated with a processing instruction for execution by the second processing circuitry and to provide a translated output memory address to the second processing circuitry.

17. A method comprising:
decoding processing instructions;
executing the decoded processing instructions in a first processing mode in which the processing circuitry is configured to execute the decoded processing instructions using one or more first registers; and
selectively initiating execution of the decoded processing instructions in a second processing mode in which the decoded processing instructions are selectively executed using one or more second registers;
the decoding step comprising decoding processing instructions selected from a first instruction set in the first processing mode and processing instructions selected from a second instruction set in the second processing mode, in which one or both of the first and second instruction sets comprises at least one instruction which is unavailable in the other of the first and second instruction sets;

the decoding step comprising decoding one or more mode change instructions to change between the first processing mode and the second processing mode; and the executing step comprising changing the current processing mode between the first processing mode and the second processing mode in response to execution of a mode change instruction, wherein the processing instructions include vector processing instructions;

the one or more first registers comprise one or more first vector registers having a first vector length;

in the first processing mode, executing the decoded processing instructions using the one or more first vector registers in accordance with a vector length no greater than the first vector length; and selectively initiating execution of the decoded processing instructions in the second processing mode using one or more second vector registers having a second vector length, in accordance with a vector length no greater than the second vector length.

18. A non-transitory computer-readable medium storing a computer program for controlling a host data processing apparatus to provide an instruction execution environment comprising:

instruction decoding program logic to decode processing instructions;

one or more first emulated registers;

first processing program logic to execute the decoded processing instructions in a first processing mode in which the first processing program logic is configured to execute the decoded processing instructions using the one or more first emulated registers; and control program logic to selectively initiate execution of the decoded processing instructions in a second processing mode in which the decoded processing instructions are selectively executed using one or more second emulated registers;

the instruction decoding program logic being configured to decode processing instructions selected from a first instruction set in the first processing mode and processing instructions selected from a second instruction set in the second processing mode, in which one or both of the first and second instruction sets comprises at least one instruction which is unavailable in the other of the first and second instruction sets;

the instruction decoding program logic being configured to decode one or more mode change instructions to change between the first processing mode and the second processing mode; and the first processing program logic being configured to change the current processing mode between the first processing mode and the second processing mode in response to execution of a mode change instruction; wherein the processing instructions include vector processing instructions;

the one or more first emulated registers comprise one or more first emulated vector registers having a first vector length;

the first processing program logic is configured, in the first processing mode, to execute the decoded processing instructions using the one or more first emulated vector registers in accordance with a vector length no greater than the first vector length; and in the second processing mode in which the decoded processing instructions are selectively executed using one or more second emulated vector registers having a second vector length, in accordance with a vector length no greater than the second vector length.

* * * * *